(12) United States Patent
Hsu et al.

(10) Patent No.: US 10,003,798 B2
(45) Date of Patent: *Jun. 19, 2018

(54) METHOD AND APPARATUS FOR REDUCTION OF DEBLOCKING FILTER

(71) Applicant: HFI Innovation Inc., Zhubei, Hsinchu County (TW)

(72) Inventors: Chih-Wei Hsu, Taipei (TW); Qian Huang, Beijing (CN); Jicheng An, Beijing (CN); Xun Guo, Beijing (CN); Yu-Wen Huang, Taipei (TW); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/375,596

(22) Filed: Dec. 12, 2016

(65) Prior Publication Data

US 2017/0094273 A1 Mar. 30, 2017

Related U.S. Application Data

(62) Division of application No. 14/342,334, filed as application No. PCT/CN2012/079889 on Aug. 9, 2012, now Pat. No. 9,554,128.

(Continued)

(30) Foreign Application Priority Data

Sep. 14, 2011 (CN) .......................... 2011 1 0270680

(51) Int. Cl.
*H04N 19/117* (2014.01)
*H04N 19/50* (2014.01)
(Continued)

(52) U.S. Cl.
CPC ........... *H04N 19/117* (2014.11); *H04N 19/14* (2014.11); *H04N 19/176* (2014.11);
(Continued)

(58) Field of Classification Search
CPC .......................... H04N 19/117; H04N 19/176
(Continued)

(56) References Cited

U.S. PATENT DOCUMENTS 8,416,860 B2 4/2013 Kawa
8,711,950 B2 4/2014 Minamoto
(Continued)

FOREIGN PATENT DOCUMENTS

CN 101127906 2/2008
CN 101540900 9/2009
(Continued)

OTHER PUBLICATIONS

Implemented architecture of deblocking filter for H264-AVC; Sheng—2004.*

(Continued)

*Primary Examiner* — Luis Perez Fuentes
(74) *Attorney, Agent, or Firm* — McClure, Qualey & Rodack, LLP

(57) ABSTRACT

A method and apparatus for deblocking reconstructed video in a video coding system. The method receives reconstructed pixel data, wherein the reconstructed pixel data is configured into LCUs (largest coding units) and each LCU is divided into blocks. The method then identifies horizontal block edges of the blocks in the LCUs, applies first vertical filtering to the reconstructed pixel data corresponding to one or more first lines above a first horizontal block edge in the first edge group, and applies second vertical filtering to the reconstructed pixel data corresponding to one or more second lines above a second horizontal block edge in the (Continued)

second edge group, wherein a first number of said one or more first lines is smaller than a second number of said one or more second lines.

10 Claims, 14 Drawing Sheets

Related U.S. Application Data

(60) Provisional application No. 61/533,892, filed on Sep. 13, 2011.

(51) Int. Cl.
*H04N 19/176* (2014.01)
*H04N 19/14* (2014.01)
*H04N 19/186* (2014.01)
*H04N 19/82* (2014.01)
*H04N 19/86* (2014.01)

(52) U.S. Cl.
CPC ........... *H04N 19/186* (2014.11); *H04N 19/50* (2014.11); *H04N 19/82* (2014.11); *H04N 19/86* (2014.11)

(58) Field of Classification Search
USPC .......................................................... 375/240
See application file for complete search history.

(56) References Cited

U.S. PATENT DOCUMENTS

| | | | | |
|---|---|---|---|---|
| 8,792,561 B2* | 7/2014 | Min | ...................... | H04N 19/139 375/240 |
| 8,855,434 B2* | 10/2014 | Sato | ....................... | H04N 19/60 382/232 |
| 8,861,617 B2* | 10/2014 | Chen | ................ | H04N 19/00103 375/240.01 |
| 9,077,989 B2* | 7/2015 | Sato | ....................... | H04N 19/80 |
| 9,143,778 B2* | 9/2015 | Narroschke | .......... | H04N 19/176 |
| 9,167,269 B2* | 10/2015 | Van der Auwera | .. | H04N 19/117 |
| 9,232,237 B2* | 1/2016 | Sadafale | ............... | H04N 19/176 |
| 9,264,721 B2* | 2/2016 | Kim | ..................... | H04N 19/159 |
| 9,317,933 B2* | 4/2016 | Sato | ......................... | G06T 9/00 |
| 9,338,476 B2* | 5/2016 | Van der Auwera | .. | H04N 19/159 |
| 9,460,488 B2* | 10/2016 | Jeon | ....................... | H04N 19/82 |
| 9,521,418 B2* | 12/2016 | Chen | ................... | H04N 19/597 |
| 9,525,884 B2* | 12/2016 | Huang | ................ | H04N 19/117 |
| 9,613,400 B2* | 4/2017 | Sato | .......................... | G06T 5/00 |
| 2005/0013494 A1 | 1/2005 | Srinivasan et al. | | |
| 2006/0098744 A1 | 5/2006 | Huang | | |
| 2006/0206664 A1 | 9/2006 | Umemura | | |
| 2007/0291857 A1 | 12/2007 | Hussain | | |
| 2008/0043853 A1 | 2/2008 | Kawa | | |
| 2008/0117980 A1 | 5/2008 | Hung et al. | | |
| 2008/0170629 A1 | 7/2008 | Shim et al. | | |
| 2008/0240252 A1* | 10/2008 | He | ...................... | H04N 19/176 375/240.24 |
| 2010/0027685 A1 | 2/2010 | Kim et al. | | |
| 2012/0106622 A1* | 5/2012 | Huang | ................ | H04N 19/129 375/240.01 |
| 2012/0189051 A1* | 7/2012 | Zheng | ................ | H04N 19/117 375/240.12 |
| 2013/0287124 A1* | 10/2013 | Norkin | ................ | H04N 19/176 375/240.29 |
| 2014/0211848 A1* | 7/2014 | Hsu | ....................... | H04N 19/50 375/240.02 |

FOREIGN PATENT DOCUMENTS

| | | |
|---|---|---|
| CN | 101883285 | 11/2010 |
| TW | 200629909 | 8/2006 |

OTHER PUBLICATIONS

NPL: HEVC Deblocking Filter; Oct. 2, 2012.*
NPL: Simplified H264-AVC deblocking filter for SVC enhanced layer; He; Apr. 2007.*
NPL: Implemented architecture of deblocking filter for H264-AVC; Sheng—2004.*
HEVC Deblocking Filter; Oct. 2, 2012.*
Simplified H264-AVC deblocking filter for SVC enhanced layer; He; Apr. 2007.*
Norkin, A., et al.; "CE12 Ericsson's and MediaTek's Deblocking Filter;" Joint Collaborative Team on Video Coding (JCT-VC) of ITU-T SG16 WP3 and ISO/IEC JTC1/SC29/WG11; Jul. 2011; pp. 1-6.
List, P., et al.; "Adaptive Deblocking Filter," IEEE Transactions on Circuits and Systems for Video Technology; vol. 13; No. 7; Jul. 2003; pp. 614-619.
Huang, Q., et al.; "Chroma Deblocking Filter;" Joint Collaborative Team on Video Coding (JCT-VC) of ITU-T SG16 WP3 and ISO/IEC JTC1/SC29/WG11; Nov. 2011; pp. 1-4.
Reducing SVC coding complexity by disabling chroma deblocking filter; He; Oct. 2006.

* cited by examiner

| | $p3_0$ | $p2_0$ | $p1_0$ | $p0_0$ | $q0_0$ | $q1_0$ | $q2_0$ | $q3_0$ | |
|---|---|---|---|---|---|---|---|---|---|
| | $p3_1$ | $p2_1$ | $p1_1$ | $p0_1$ | $q0_1$ | $q1_1$ | $q2_1$ | $q3_1$ | |
| | $p3_2$ | $p2_2$ | $p1_2$ | $p0_2$ | $q0_2$ | $q1_2$ | $q2_2$ | $q3_2$ | — 240 |
| | $p3_3$ | $p2_3$ | $p1_3$ | $p0_3$ | $q0_3$ | $q1_3$ | $q2_3$ | $q3_3$ | |
| | $p3_4$ | $p2_4$ | $p1_4$ | $p0_4$ | $q0_4$ | $q1_4$ | $q2_4$ | $q3_4$ | |
| | $p3_5$ | $p2_5$ | $p1_5$ | $p0_5$ | $q0_5$ | $q1_5$ | $q2_5$ | $q3_5$ | — 250 |
| | $p3_6$ | $p2_6$ | $p1_6$ | $p0_6$ | $q0_6$ | $q1_6$ | $q2_6$ | $q3_6$ | |
| | $p3_7$ | $p2_7$ | $p1_7$ | $p0_7$ | $q0_7$ | $q1_7$ | $q2_7$ | $q3_7$ | |

| | $p3_0$ | $p2_0$ | $p1_0$ | $p0_0$ | $q0_0$ | $q1_0$ | $q2_0$ | $q3_0$ | — 260 |
|---|---|---|---|---|---|---|---|---|---|
| | $p3_1$ | $p2_1$ | $p1_1$ | $p0_1$ | $q0_1$ | $q1_1$ | $q2_1$ | $q3_1$ | — 261 |
| | $p3_2$ | $p2_2$ | $p1_2$ | $p0_2$ | $q0_2$ | $q1_2$ | $q2_2$ | $q3_2$ | — 262 |
| | $p3_3$ | $p2_3$ | $p1_3$ | $p0_3$ | $q0_3$ | $q1_3$ | $q2_3$ | $q3_3$ | — 263 |
| | $p3_4$ | $p2_4$ | $p1_4$ | $p0_4$ | $q0_4$ | $q1_4$ | $q2_4$ | $q3_4$ | — 264 |
| | $p3_5$ | $p2_5$ | $p1_5$ | $p0_5$ | $q0_5$ | $q1_5$ | $q2_5$ | $q3_5$ | — 265 |
| | $p3_6$ | $p2_6$ | $p1_6$ | $p0_6$ | $q0_6$ | $q1_6$ | $q2_6$ | $q3_6$ | — 266 |
| | $p3_7$ | $p2_7$ | $p1_7$ | $p0_7$ | $q0_7$ | $q1_7$ | $q2_7$ | $q3_7$ | — 267 |

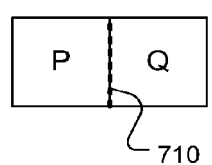
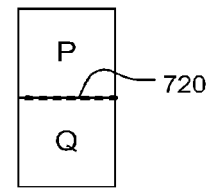
Fig. 7A            Fig. 7B
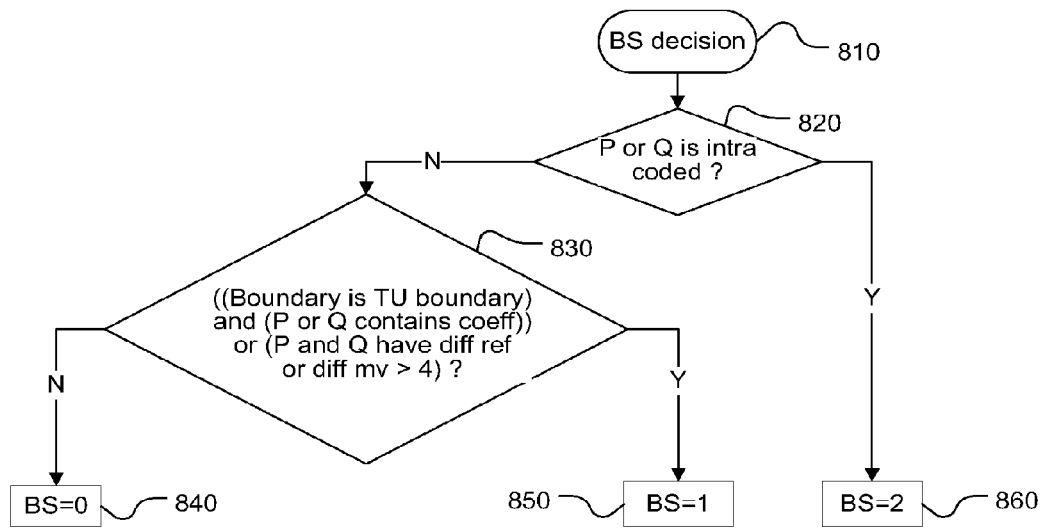
Fig. 8

| QP | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |
| QP | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 2 | 2 | 2 | 2 | 3 | 3 | 3 | 3 | 4 | 4 | 4 |
| QP | 38 | 39 | 40 | 41 | 42 | 43 | 44 | 45 | 46 | 47 | 48 | 49 | 50 | 51 | 52 | 53 | | | |
| β | 38 | 40 | 42 | 44 | 46 | 48 | 50 | 52 | 54 | 56 | 58 | 60 | 62 | 64 | | | | | |
| $t_C$ | 5 | 5 | 6 | 6 | 7 | 8 | 9 | 10 | 11 | 13 | 14 | 16 | 18 | 20 | 22 | 24 | | | |

Fig. 9

METHOD AND APPARATUS FOR REDUCTION OF DEBLOCKING FILTER

CROSS REFERENCE TO RELATED APPLICATIONS

The present invention is a Divisional of pending U.S. patent application Ser. No. 14/342,334, filed on Feb. 28, 2014, which is a National Stage of PCT Application Ser. No. PCT/CN2012/079889, filed on Aug. 9, 2012, which claims priority to U.S. Provisional Patent Application, Ser. No. 61/533,892, filed on Sep. 13, 2011, entitled "Line Buffers Reduction for Deblocking Filter", and Chinese Patent Application, Serial No. 201110270680.5, filed on Sep. 14, 2011, entitled "A Method of Deblocking Filter". The priority applications are hereby incorporated by reference in their entireties.

FIELD OF THE INVENTION

The present invention relates to video coding system. In particular, the present invention relates to method and apparatus for reduction of line buffers associated with deblocking filter.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive inter/intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

The coding process in HEVC encodes or decodes a picture using a block structure named Largest Coding Unit (LCU). The LCU is adaptively partitioned into coding units (CUs) using quadtree. In each leaf CU, DF is performed for each 8×8 block and in HEVC Test Model Version 4.0 (HM-4.0), the DF is applied to 8×8 block boundaries. For each 8×8 block, horizontal filtering across vertical block boundaries (also called vertical edges) is first applied, and then vertical filtering across horizontal block boundaries (also called horizontal edges) is applied. During processing of a luma block boundary, four pixels on each side of the boundary are involved in filter parameter derivation, and up to three pixels on each side of the boundary may be changed after filtering. FIG. 2A illustrates the pixels involved in the DF process for a vertical edge 210 between two blocks, where each smallest square represents one pixel. The pixels on the left side (i.e., pixel columns p0 to p3 as indicated by 220) of the edge are from one 8×8 block, and the pixels on the right side (i.e., pixel columns q0 to q3 as indicated by 230) of the edge are from another 8×8 block. In the DF process according to HM-4.0, the coding information of the two 8×8 blocks is used to calculate the boundary strength of the edge first. However, there are also variations where the boundary strength is determined using other schemes. After the boundary strength is determined, columns p0-p3 and q0-q3 of the reconstructed pixels are used to derive filter parameters including filter on/off decision and strong/weak filter selection as shown in FIG. 2B and FIG. 2C respectively. FIG. 2B illustrates an example of filter on/off decision based on pixels from the third line 240 (counted from top) and the sixth line 250 according to HM-4.0. FIG. 2C illustrates an example of filter strong/weak decision for each line based on respective boundary pixels as indicated by the thick-lined boxes 260-267. In HM-4.0, the derivation is only required for the luma component. Finally, reconstructed pixels are horizontally filtered to generate DF intermediate pixels. During the luma filtering horizontally across the vertical boundary 210, pixels in columns p0-p3 and q0-q3 are referenced, but only pixels in columns p0-p2 and q0-q2 may be modified (i.e., filtered).

For horizontal filtering across vertical block boundaries, unfiltered reconstructed pixels (i.e., pre-DF pixels) are used for filter parameter derivation and also used as source pixels for the filter operation. For vertical filtering across horizontal block boundaries, unfiltered reconstructed pixels (i.e., pre-DF pixels) are used for filter parameter derivation, and DF intermediate pixels (i.e. pixels after horizontal filtering) are used as source pixels for the vertical filtering. For DF process of a chroma block boundary, two pixels on each side are involved in filter parameter derivation, and at most one pixel on each side may be modified after filtering. During chroma filtering, pixels in columns p0-p1 and q0-q1 are referenced, but only pixels in columns p0 and q0 are filtered.

FIG. 3 illustrates the boundary pixels involved in the DF process for a horizontal edge 310, where each smallest square represents one pixel. The pixels on the upper side (i.e., pixel rows p0 to p3 as indicated by 320) of the edge are from one 8×8 block, and the pixels on the lower side (i.e., pixel rows q0 to q3 as indicated by 330) of the edge are from another 8×8 block. The DF process for the horizontal edge is similar to the DF process for the vertical edge. First, the coding information of the two 8×8 blocks is used to calculate the boundary strength of the edge. Next, rows p0-p3 and q0-q3 of reconstructed pixels are used to derive filter parameters including filter on/off decision and strong/weak filter selection. Again, this is only required for luma. In HM-4.0, reconstructed pixels are used for deriving filter decisions. Finally, DF intermediate pixels are vertically filtered to generate DF output pixels. During the luma filtering, pixels in rows p0-p3 and q0-q3 are referenced, but only pixels in rows p0-p2 and q0-q2 are filtered. During chroma filtering, pixels in rows p0-p1 and q0-q1 are referenced, but only pixels in rows p0 and q0 are filtered.

When DF is processed on an LCU by LCU basis in a raster scan order, there will be data dependency between LCUs as shown in FIG. 4A through FIG. 4D. Vertical edges in each LCU are horizontally filtered first and horizontal edges are then vertically filtered. The rightmost vertical edge of the current LCU cannot be horizontally filtered until the involved boundary pixels from the next LCU become available. Similarly, the lowest horizontal edge of the current LCU cannot be vertically filtered until the involved boundary pixels from the below LCU become available. Accordingly, data buffers are required to accommodate filtering operation due to the data dependency. For the horizontal DF process of the vertical boundary between two adjacent LCUs, four reconstructed pixel columns of one LCU height will be required for the luma component and two reconstructed pixel columns of one LCU height are required for the chroma component. FIG. 4A illustrates the pixels involved in the DF process of the vertical boundary between a current LCU 410 and an adjacent LCU 412 on the left, where four pixel columns from the adjacent LCU 412 are required. Similarly, four pixel rows from the above LCUs will also be buffered for the vertical DF process. Accordingly, four pixel rows for the adjacent LCUs 410a, 420a, 412a and 422a corresponding to LCUs 410, 420, 412 and 422 respectively are buffered. In FIGS. 4A-4D, an unfiltered pixel 401 is indicated by a non-shaded smallest square. On the other hand, a horizontally filtered pixel 402, a vertically filtered pixel 403, and a horizontally and vertically filtered pixel 404 are indicated by different shaded patterns. As shown in FIG. 4A, the three pixel columns on each side of the vertical boundaries may be changed after the horizontal DF filtering.

After horizontal filtering of the vertical edges of LCU 410, vertical DF process can be applied to the horizontal edges of LCU 410 except for the bottom edge. The horizontally filtered pixels, vertically filtered pixels, and horizontally and vertically filtered pixels after the vertical DF filtering are shown in FIG. 4B. The DF process is then moved to the next LCU 420. Horizontal DF process is applied to the vertical edges of LCU 420 except for the rightmost edge and the horizontally filtered pixels are indicated by respective shaded areas in FIG. 4C. The boundary pixels of LCU 410 corresponding to the vertical edge between LCU 410 and LCU 420 are also processed by the horizontal DF process during this step. After horizontal DF process of vertical edges of LCU 420, the vertical DF process is applied to the horizontal edges of LCU 420 except for the bottom edge. The corresponding processed pixels are shown in FIG. 4D. The DF process shown in FIG. 4A to FIG. 4D are intended to illustrate an example of data dependency associated with the DF process. Depending on the particular DF process used, the line and column buffer requirement due to data dependency may be different.

In addition to pixel line buffers for unfiltered and filtered pixels of neighboring LCUs, there is also a need for storing other information to support LCU-based DF process.

For hardware based implementation, these column buffers are often implemented as on-chip registers or SRAMs since the storage requirement for preceding pixel columns is relatively small. For example, four reconstructed pixel columns of one LCU height and two reconstructed pixel columns of one LCU height are required for processing DF on luma and chroma respectively. On the other hand, the line buffers for storing the four pixels rows of one picture width for luma and two pixel rows of one picture width for chroma corresponding to the LCUs above may be sizeable, particularly for large size pictures. Line buffer implementation based on on-chip memory (e.g. Static Random Access Memory (SRAM)) may significantly increase the chip cost. On the other hand, line buffer implementation based on off-chip memory (e.g. Dynamic Random Access Memory (DRAM)) may significantly increase power consumption and system bandwidth. Therefore, it is desirable to reduce line buffers required for the DF process.

BRIEF SUMMARY OF THE INVENTION

A method and apparatus for deblocking reconstructed video are disclosed. In one embodiment of the present invention, the method receives reconstructed pixel data, wherein the reconstructed pixel data is configured into LCUs (largest coding units) and each LCU is divided into blocks. The method then identifies horizontal block edges of the blocks in the LCUs, wherein the horizontal block edges are divided into a first edge group and a second edge group, and wherein the first edge group corresponds to horizontal block edges between two LCUs and the second edge group corresponds to remaining horizontal block edges not included in the first edge group. The method then applies first vertical filtering to the reconstructed pixel data corresponding to one or more first lines above a first horizontal block edge in the first edge group. The method further applies second vertical filtering to the reconstructed pixel data corresponding to one or more second lines above a second horizontal block edge in the second edge group, wherein a first number of said one or more first lines is smaller than a second number of said one or more second lines.

In another embodiment, an apparatus of deblocking reconstructed video in a video coding system comprises at least one circuit configured to: receive reconstructed pixel data, wherein the reconstructed pixel data is configured into LCUs (largest coding units) and each LCU is divided into blocks; identify horizontal block edges of the blocks in the LCUs, wherein the horizontal block edges are divided into a first edge group and a second edge group, and wherein the first edge group corresponds to horizontal block edges between two LCUs and the second edge group corresponds to remaining horizontal block edges not included in the first edge group; apply first vertical filtering to the reconstructed pixel data corresponding to one or more first lines above a first horizontal block edge in the first edge group; and apply second vertical filtering to the reconstructed pixel data corresponding to one or more second lines above a second horizontal block edge in the second edge group, wherein a first number of said one or more first lines is smaller than a second number of said one or more second lines.

BRIEF DESCRIPTION OF THE DRAWINGS

FIG. 2B illustrates an example of filter on/off decision for the vertical edge based on line 2 and line 5 according to HM-4.0.

FIG. 2C illustrates an example of filter strong/weak decision for each line across the vertical boundary based on pixels in the respective line.

FIG. 6A illustrates an example of dividing a vertical block boundary into two sub-boundaries according to an embodiment of the present invention.

FIG. 6B illustrates an example of dividing a horizontal block boundary into two sub-boundaries according to an embodiment of the present invention.

FIG. 7A-FIG. 7B illustrate 4×4 boundary strength determination for a vertical and horizontal boundary between two 4×4 blocks respectively.

FIG. 8 illustrates an example of boundary strength determination according to an embodiment of the present invention.

FIG. 9 illustrates an example of dependency of filter decision threshold β and filter clipping threshold $t_C$ on the quantization parameter QP for deblocking filter.

DETAILED DESCRIPTION OF THE INVENTION

In an embodiment of the present invention, the line buffer for storing pixel rows of the above LCUs according to the LCU-based DF processing is reduced. For horizontal edges between two LCU rows, only reconstructed pixels p0 and q0-q3 are used to derive filter on/off and strong/weak decisions for the luma component. Furthermore, according to the present invention, the vertical filtering will only be applied to pixels corresponding to rows of p0 and q0-q3, where the vertical filtering is applied to DF intermediate pixels p0 and q0-q3. For the chroma component according to the present invention, the vertical filtering will only be applied to pixels corresponding to rows of p0 and q0, where the vertical filtering is applied to DF intermediate pixels p0 and q0-q1. For the DF process on other edges, the DF process according to HM-4.0 can be used. Accordingly, only one luma line buffer and one chroma line buffer are required to store reconstructed pixels of row p0 from the LCUs above. In HM-4.0, one luma line buffer and one chroma line buffer for the bottom row of the blocks above are already used for intra prediction, and the same line buffers can be used to fulfill the need of line buffers for the DF process according to the present invention. Consequently, for the DF process according to the present invention, there is no need for any additional line buffers beyond what have already been used in the encoder or decoder system for intra prediction.

While the vertical DF filtering across a horizontal edge between two LCUs according to the present invention may only modify line p0, the filtering decisions and filter parameter derivation can be extended to include pixels corresponding to lines p1-p3 for potential improvement of the DF filtering. The computations may become more complicated if more pixels are involved. As a tradeoff between the cost and subjective quality related to the DF process, an embodiment according to the present invention utilizes sub-sampled pixels from lines p1-p3. The pixel data stored in the additional line buffers may correspond to either reconstructed pixels or DF intermediate pixels. Furthermore, any sub-sampling pattern may be used to reduce the computations as well as the storage requirement involved with the filtering decision. FIG. 5A to FIG. 5D illustrate four examples of sub-sampled patterns of pixel data for filter decision derivations. These samples may also be used for the vertical DF filtering operation at the LCU horizontal boundaries.

Figure 1A:
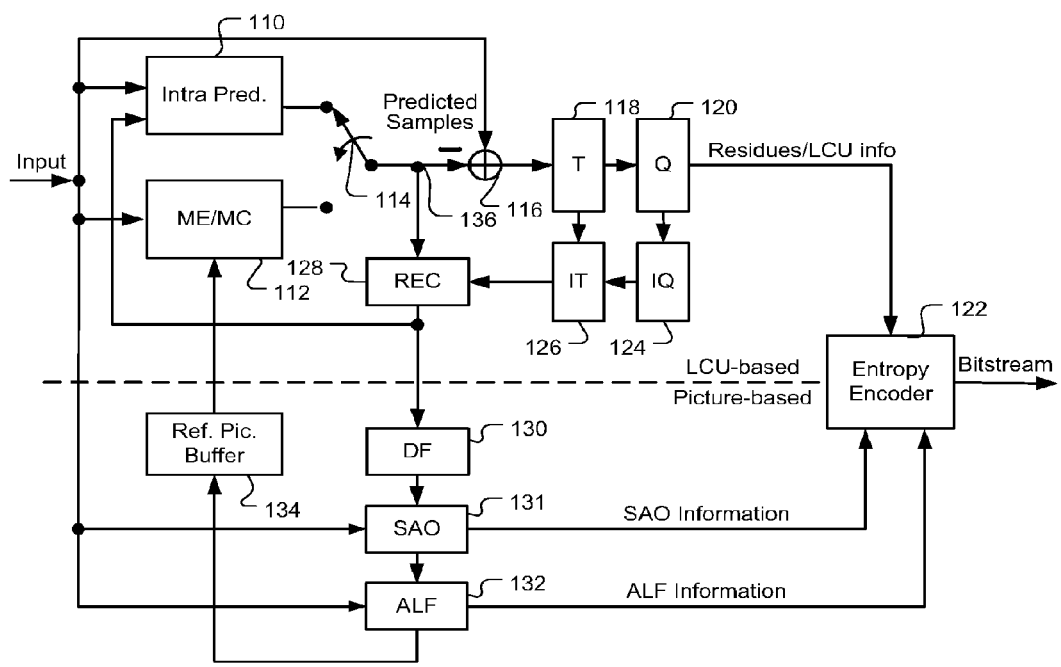
FIG. 1A illustrates an exemplary adaptive inter/intra video encoding system incorporating DF, SAO and ALF in-loop processing.
Figure 1B:
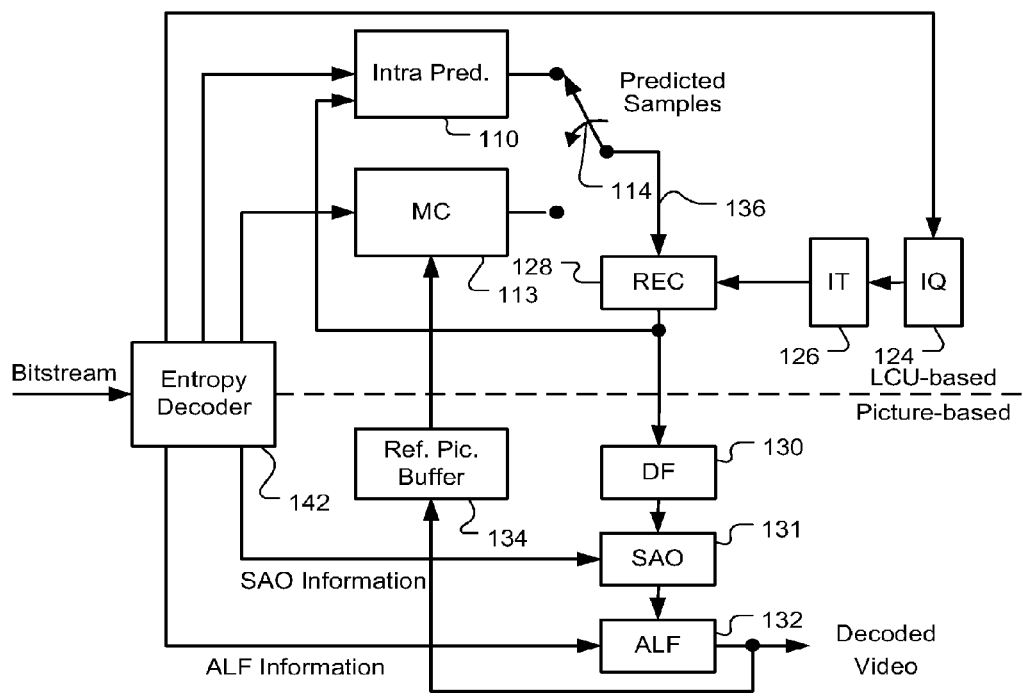
FIG. 1B illustrates an exemplary adaptive inter/intra video decoding system incorporating DF, SAO and ALF in-loop processing.
Figure 2A:
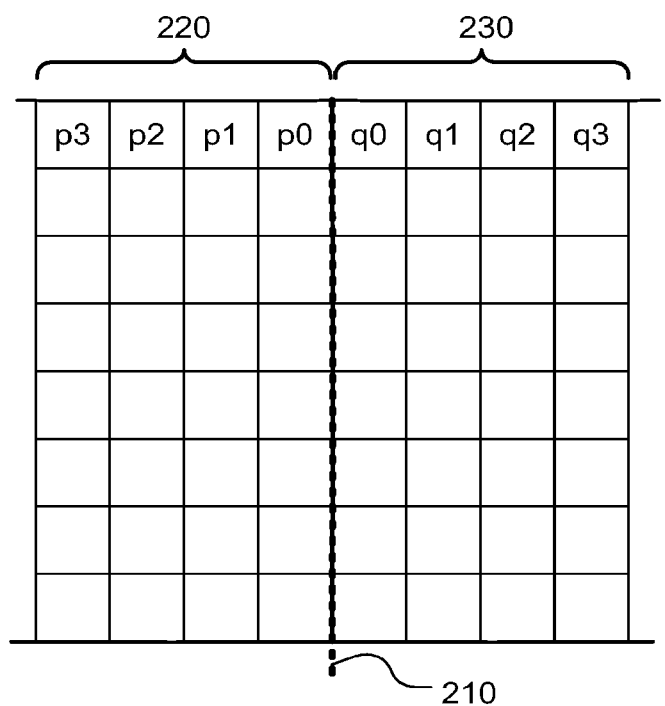
FIG. 2A illustrates an example of a vertical edge between two 8×8 blocks.
Figure 3:
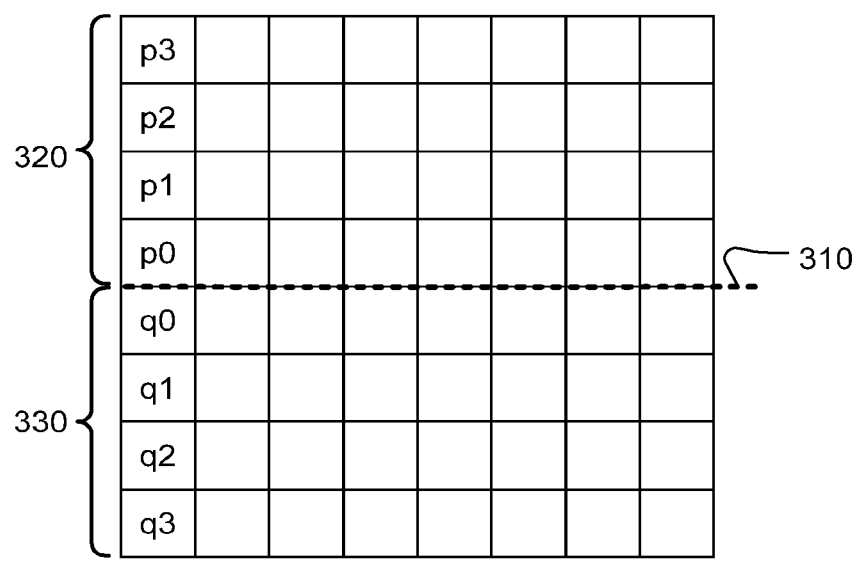
FIG. 3 illustrates an example of a horizontal edge between two 8×8 blocks.
Figure 4A:
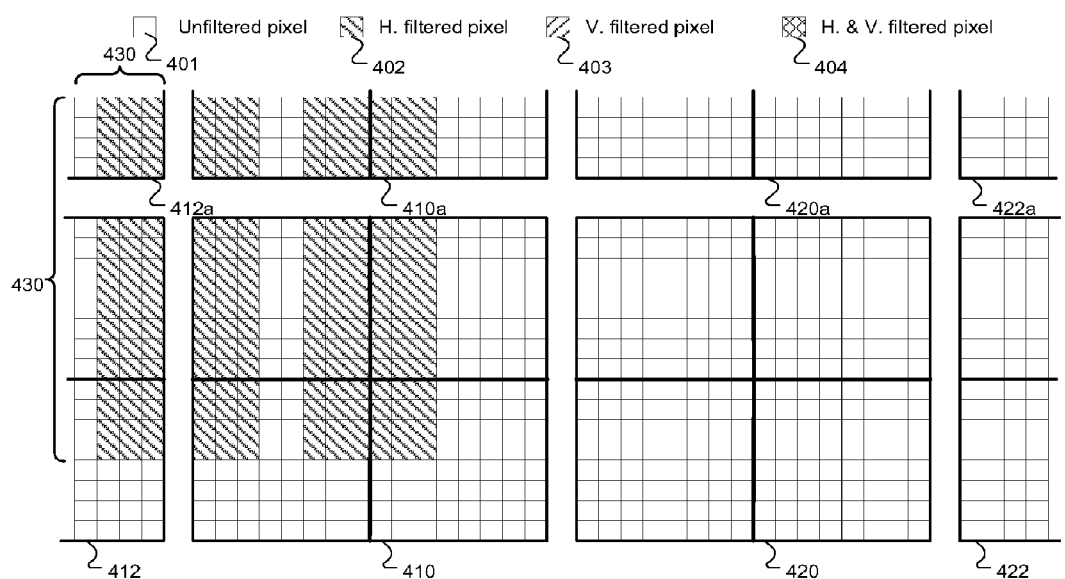
FIG. 4A-FIG. 4D illustrate an example of various stages of horizontal and vertical DF process.
Figure 4B:
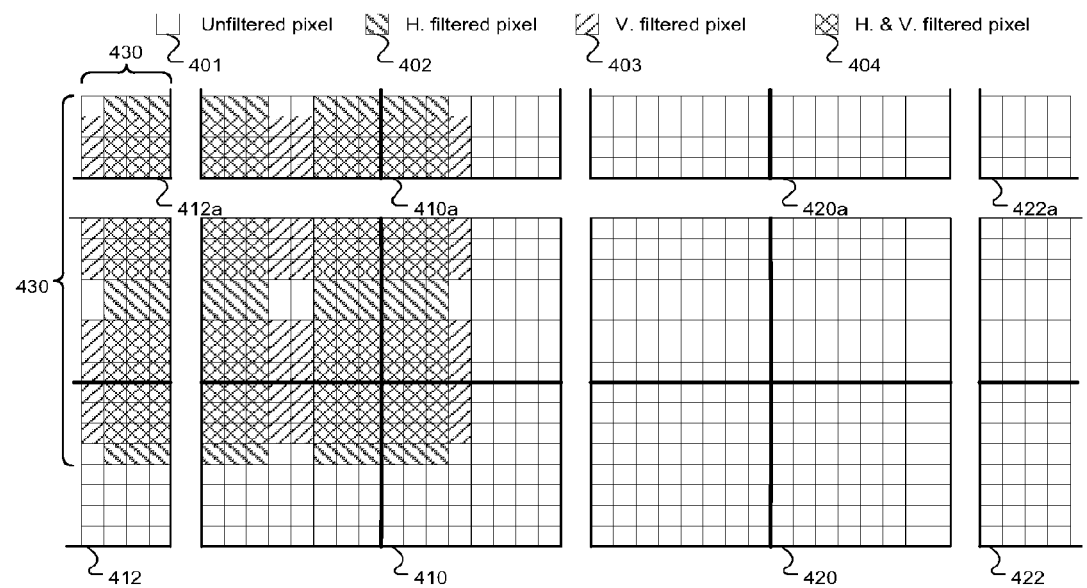
Figure 4C:
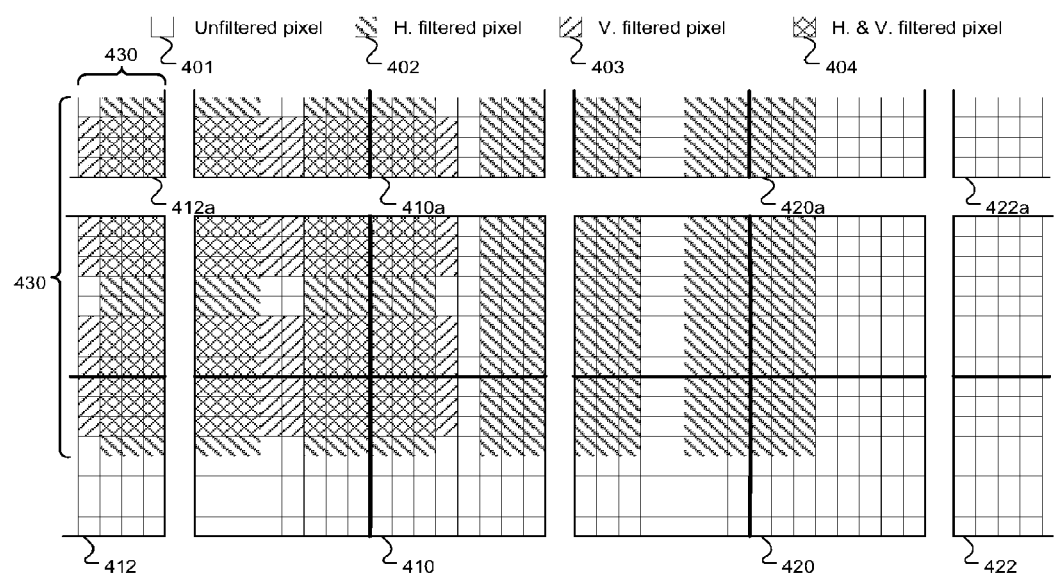
Figure 4D:
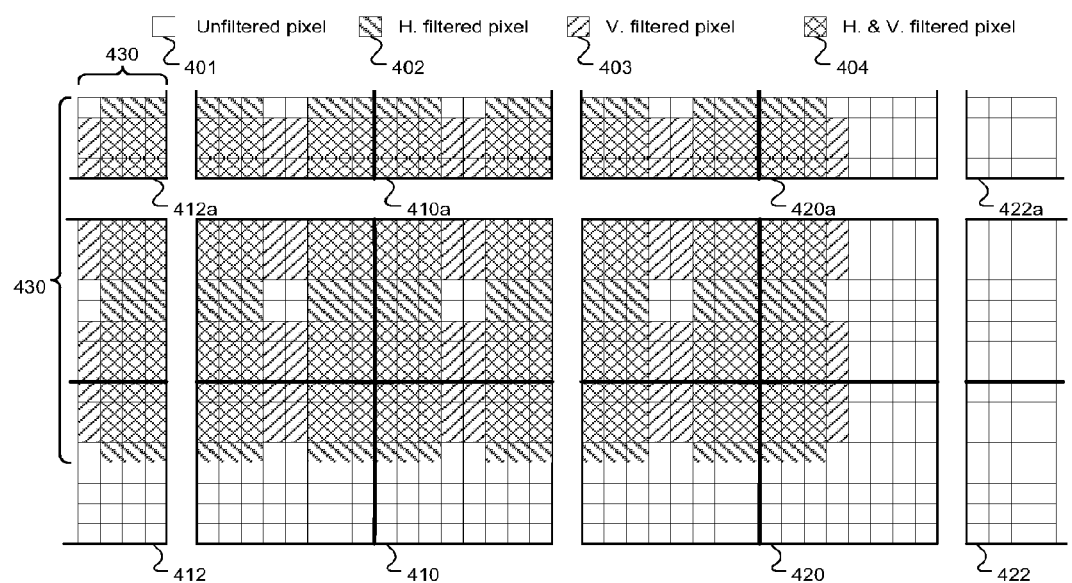
Figure 5A:
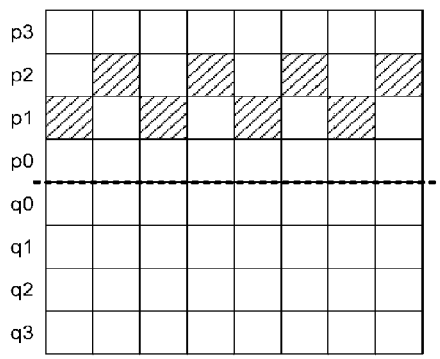
FIG. 5A-FIG. 5D illustrate various examples of sub-sampling pattern to store additional lines for filter decision and/or filter operation according to an embodiment of the present invention.
Figure 5B:
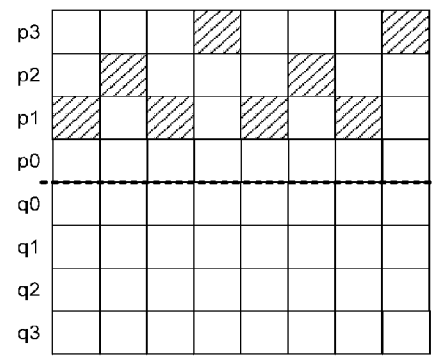
Figure 5C:
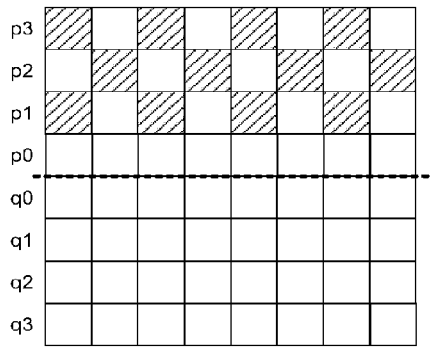
Figure 5D:
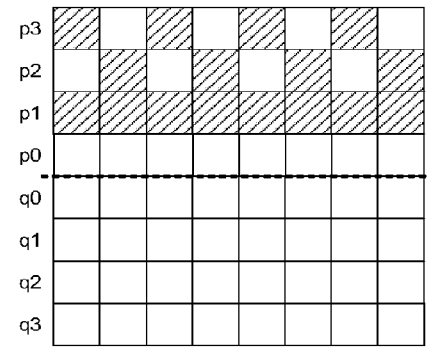

In the example of filter on/off decision as shown in FIG. 2B, the decision is based on pixels from line 2 (i.e., the third line) and line 5 (i.e., the sixth line) according to HM-4.0. Therefore, when applying the DF filtering to the bottom four pixel rows of the above LCUs (410a, 420a, 412a and 422a), the on/off decision for the 8×8 blocks will have to be stored. An embodiment according to the present invention can eliminate the requirement to store the on/off decision for DF filtering on the bottom four pixel rows of the above LCUs. According to the present invention, the on/off decision of the horizontal DF filtering for the upper four lines of a block is based on line 2, and the on/off decision of the horizontal DF filtering for the lower four lines is based on line 5. Accordingly, the on/off decision for the lower four lines and the upper four lines can be determined based on pixels within respective groups without referring to each other. There is no need to store the on/off decision of the horizontal DF filtering for the lower four pixel rows of the above LCUs.

Figures 6A, 6B:
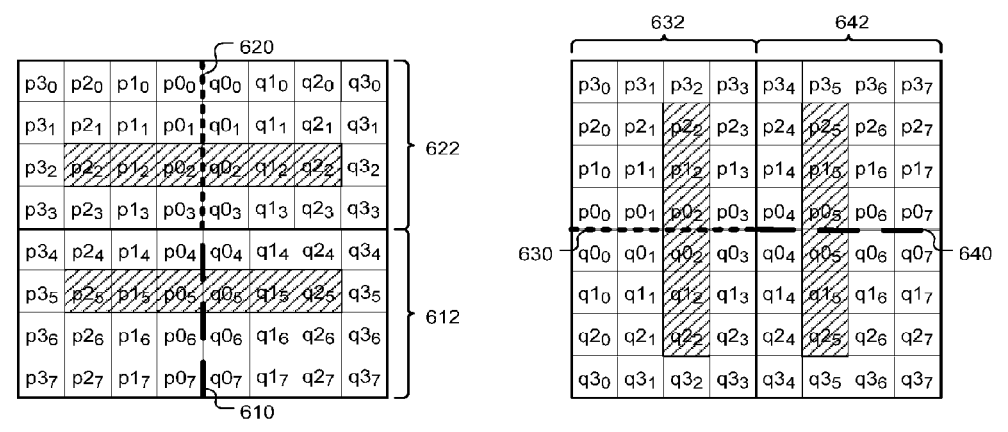

The above example illustrates modified horizontal DF process to reduce memory requirement by removing the data dependency between the upper four lines and the lower four lines of the 8×8 blocks above the LCU top-side boundary during filter on/off decision. The modification can be applied to any block boundaries. Furthermore, the filter decision derivation is not restricted to line 2 and line 5. Accordingly, an embodiment of the present invention treats the boundary between two 8×8 luma blocks as two sub-boundaries. For a vertical boundary, the two sub-boundaries correspond to a lower boundary 610 and an upper boundary 620 between two adjacent 8×8 blocks as shown in FIG. 6A. The sub-boundary pixels associated with a lower sub-boundary 610 (shown in long dashed line) are indicated by box 612 and the sub-boundary pixels associated with the upper sub-boundary 620 (shown in short dashed line) is indicated by box 622 as shown in FIG. 6A. The sub-boundary pixels 612 are also called a first pixel group, which comprises a first group of line segments across the lower sub-boundary 610 of the vertical boundary. Similarly, the sub-boundary pixels 622 are also called a second pixel group, which comprises a second group of line segments across the upper sub-boundary 620 of the vertical boundary. For a horizontal boundary, the two sub-boundaries correspond to a left boundary 630 (shown in short dashed line) and a right boundary 640 (shown in long dashed line) between two adjacent 8×8 blocks are shown in FIG. 6B. The sub-boundary pixels associated with a left sub-boundary 630 are indicated by box 632, as shown in FIG. 6B and the pixels in box 632 are called the first pixel group. The first pixel group in this case comprises a first group of column segments across the left sub-boundary 630 of the horizontal boundary. The sub-boundary pixels associated with the right sub-boundary are indicated by box 642, as shown in FIG. 6B and the pixels in box 642 are called the second pixel group. The second pixel group in this case comprises a second group of column segments across the right sub-boundary 640 of the horizontal boundary. An embodiment according to the present invention determines the filter on/off and strong/weak decisions and applies the DF filtering individually based on pixels from the respective pixel group. In general, the boundary strength, filter on/off decision, strong/weak filter decision, or a combination thereof for the first pixel group is determined solely based on pixels from the first pixel group. For example, the edge activity measure, d1 can be computed as follows:

$$d1=|p2-2p1+p0|+|q2-2q1+q0|, \quad (1)$$

where the computation is performed using one line of the respective sub-boundary pixels. Accordingly, the edge activity measure, d1_upper for the upper sub-boundary in FIG. 6A can be computed based on one of the upper four lines. Similarly, the edge activity measure, d1_lower for the lower sub-boundary in FIG. 6A can be computed based on one of the lower four lines. For example, d1_upper can be determined using line 3 (i.e., the fourth line) and d1_lower can be determined using line 4 (i.e., the fifth line), $$d1\_upper=|p2_3-2p1_3+p0_3|+|q2_3-2q1_3+q0_3|, \text{ and} \quad (2)$$

$$d1\_lower=|p2_4-2p1_4+p0_4|+|q2_4-2q1_4+q0_4|. \quad (3)$$

As shown in equations (2) and (3), the edge activity measure consists of two parts, where the first part, d1_upper$_R$ or d1_lower$_R$ is associated with pixels on the left side of the sub-boundary and the second part, d1_upper$_L$ or d1_lower$_L$ is associated with pixels on the right side of the sub-boundary. After the edge activity measure for a sub-boundary is determined, the condition regarding whether to apply the DF filtering across the respective sub-boundary is tested according to $$(d1\_upper<<1)<Beta\_Luma, \text{ and} \quad (4)$$

$$(d1\_lower<<1)<Beta\_Luma, \quad (5)$$

where Beta_Luma is a threshold. If equation (4) is satisfied, the horizontal DF filtering is applied to the upper sub-boundary. If equation (5) is satisfied, the horizontal DF filtering is applied to the lower sub-boundary. While one line from the upper four lines is used to determine filter on/off for the upper four lines, more than one line may also be used to determine filter on/off control. Similarly, more than one line from the lower four lines may be used to determined filter on/off control for the lower four lines.

In one variation of DF process in HEVC, an additional test is performed to determine whether to use a weak DF filter or a strong filter. The edge activity measures corresponding to the right side and left side of the sub-boundary are compared with another threshold, side Threshold. For example, the follow tests are performed for the upper sub-boundary $$(d1\_upper_R<<1)<sideThreshold, \text{ and} \quad (6)$$

$$(d1\_upper_L<<1)<sideThreshold. \quad (7)$$

If the condition in equation (6) is satisfied, the weak filter is applied to the second pixel from the vertical boundary for each upper line on the right side of the upper sub-boundary. If the condition in equation (7) is satisfied, the weak filter is applied to the second pixel from the vertical boundary for each upper line on the left side of the upper sub-boundary. Similar process for the lower sub-boundary can be performed by evaluating the conditions:

$$(d1\_lower_R<<1)<sideThreshold, \text{ and} \quad (8)$$

$$(d1\_lower_L<<1)<sideThreshold. \quad (9)$$

An embodiment according to the present invention treats the boundary between two 4×4 chroma blocks as two sub-boundaries, where a vertical sub-boundary can be separated into an upper sub-boundary and a lower sub-boundary, and a horizontal boundary can be separated into a left sub-boundary and a right sub-boundary. The embodiments of the present invention for the luma component are applicable to the chroma components, where the DF process may be performed in reduced resolution.

The derivations of filter on/off and strong/weak decision illustrated above are for a vertical boundary. The derivations of filter on/off and strong/weak decision for a horizontal boundary can be derived similarly. While one line from the upper four lines is used to determine strong/weak filter for the upper four lines, more than one line may also be used to determine strong/weak filter control. Similarly, more than one line from the lower four lines may be used to determined strong/weak filter control for the lower four lines.

In HEVC, deblocking filter is applied to boundaries of 8×8 blocks, where the boundary strength (BS) is determined based on 4×4 blocks. For the luma component, the stronger of the boundary strengths for the two neighboring 4×4 blocks associated with an 8×8 block is used as the boundary strength of the corresponding boundary of the 8×8 block. An embodiment according to the present invention derives the boundary strength for the sub-boundaries between two 8×8 blocks individually based on the respective 4×4 blocks. FIG. 7A illustrates an example of a horizontal sub-boundary 710 between two 4×4 blocks, P and Q. FIG. 7B illustrates an example of a vertical sub-boundary 720 between two 4×4 blocks, P and Q. An exemplary boundary strength derivation for the sub-boundary is shown in FIG. 8. The boundary strength decision starts from block 810. A test, "P or Q is intra coded?" is performed in step 820. If the result is Yes (as indicated by "Y" in FIG. 8), BS is assigned a value of 2. If the test result of step 820 is No (as indicated by "N" in FIG. 8), a further test 830 is performed. In step 830, the test, "((Boundary is TU boundary) and (P or Q contains coefficients)) or (P and Q have different reference picture or MV difference>4)?" is performed. If the test result is Yes, BS is assigned a value of 1. Otherwise, BS is assigned a value of 0. While the use of 4×4 sub-boundary for 8×8 blocks is illustrated as an example, the present invention may also be used for other block sizes and other sub-boundary sizes.

The BS value can be used to control deblocking operation such as filter on/off control. An exemplary BS usage is shown in Table 1. If BS value is 0, the deblocking filter is turned off. If BS value is 1, the luma deblocking filtering is turned on and the filter parameter, $t_c$ offset as defined in the HEVC standard is set to 0. If BS value is 2, both luma and chroma deblocking filtering is turned on and $t_c$ offset is set to 2.

TABLE 1

| BS value | Usage of BS |
| --- | --- |
| 0 | Filtering off |
| 1 | Luma filtering on & $t_c$ offset = 0 |
| 2 | Luma filtering on & Chroma filtering on & $t_c$ offset = 2 |

Figure 10A:
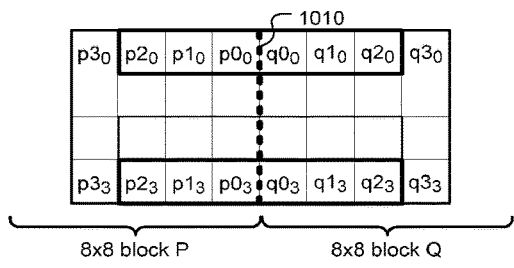
FIG. 10A illustrates an example of pixels used for filter on/off decision and filter strong/weak decision for a vertical sub-boundary between two 4×4 blocks.
Figure 10B:
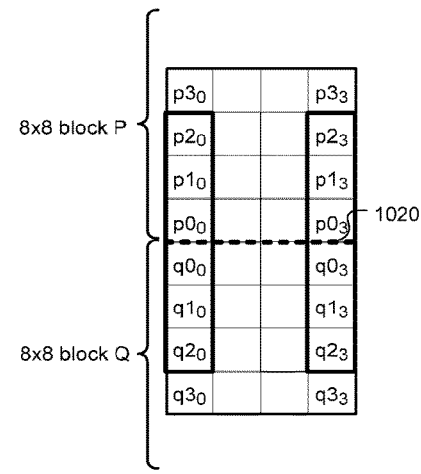
FIG. 10B illustrates an example of pixels used for filter on/off decision and filter strong/weak decision for a horizontal sub-boundary between two 4×4 blocks.

According to the HEVC standard, deblocking parameters comprise $\beta$ and $t_c$. The parameter $\beta$ is used to determine filter decision threshold and the value is related to quantization parameter (QP) of the block. An embodiment according to the present invention determines the QP for sub-boundary according to QP=(QP$_P$+QP$_Q$)/2, where QP$_P$ is the QP for block P and QP$_Q$ is the QP for block Q. The dependency of $\beta$ on QP is shown in FIG. 9. On the other hand, the parameter $t_c$ is used for filter clipping threshold. The dependency of $t_c$ on QP is shown in FIG. 9. If BS is greater than 1, the parameter $t_c$ is specified using QP+2 as the table input. Otherwise, the parameter $t_c$ is specified using QP as the table input. As shown in Table 1, the deblocking filtering may be on only if BS value is greater than 0. The parameter $\beta$ is determined as shown in FIG. 9. The filter on/off decision can be determined according to the BS value for the respective sub-boundary and the edge activity measured using the 4×4 block. FIG. 10A illustrates an example of deriving the edge activity based on two lines across the sub-boundary:

$$d_p = |p2_0 - 2p1_0 + p0_0| + |p2_3 - 2p1_3 + p0_3|, \quad (10)$$

$$d_q = |q2_0 - 2q1_0 + q0_0| + |q2_3 - 2q1_3 + q0_3|, \text{ and} \quad (11)$$

$$d = d_p + d_q. \quad (12)$$

If BS>0 and d<$\beta$, then apply the deblocking filter. Otherwise, the deblocking filtering is not applied. The above derivation illustrates a specific example to derive edge activity based on two lines from the two neighboring 4×4 blocks. However, more or less lines may be used to derive the edge activity. Furthermore, while specific formula is used to derive the edge activity, a person skilled in the art may use other formulas to measure the edge activity.

The strong/weak filter decision can also be derived based on the edge activity and other measure. For example, if (d<($\beta$>>2)&&|p$_3$−p$_0$|+|q$_0$−q$_3$|<($\beta$>>3)&&|p$_0$−q$_0$|<(5*$t_c$+1)>>1) is true for both line 0 and line 3, a strong filter is selected. Otherwise, a weak filter is selected. After the BS, filter on/off control and strong/weak filter decision are made, the deblocking filtering can be applied to luma and chroma signals. For the luma signal with pixels $p_3$, $p_2$, $p_1$, $p_0$, $q_0$, $q_1$, $q_2$, and $q_3$ across the boundary, the strong luma filtering can be performed according to:

$$p_0' = \text{Clip3}(p_0 - 2*t_C, p_0 + 2*t_C, (p_2 + 2*p_1 + 2*p_0 + 2*q_0 + q_1 + 4) >> 3) \quad (13)$$

$$p_1' = \text{Clip3}(p_1 - 2*t_C, p_0 + 2*t_C, (p_2 + p_1 + p_0 + q_0 + 2) >> 2) \quad (14)$$

$$p_2' = \text{Clip3}(p_2 - 2*t_C, p_0 + 2*t_C, (2*p_3 + 3*p_2 + p_1 + p_0 + q_0 + 4) >> 3) \quad (15)$$

$$q_0' = \text{Clip3}(q_0 - 2*t_C, p_0 + 2*t_C, (p_1 + 2*p_0 + 2*q_0 + 2*q_1 + q_2 + 4) >> 3) \quad (16)$$

$$q_1' = \text{Clip3}(q_1 - 2*t_C, p_0 + 2*t_C, (p_0 + q_0 + q_1 + q_2 + 2) >> 2) \quad (17)$$

$$q_2' = \text{Clip3}(q_2 - 2*t_C, p_0 + 2*t_C, (p_0 + q_0 + q_1 + 3*q_2 + 2*q_3 + 4) >> 3) \quad (18)$$

where $p_3'$, $p_2'$, $p_1'$, $p_0'$, $q_1'$, $q_2'$, and $q_3'$ are the filtered pixel data. Clip3(max, min, x) is a function that clip variable x between the max and min.

Figure 11:
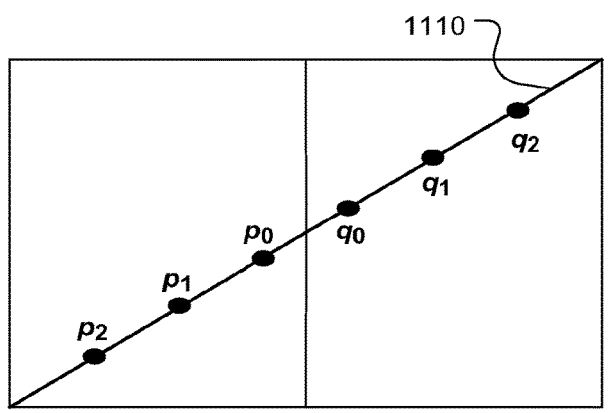
FIG. 11 illustrates an example of luma weak filtering, where Δ's are equal to zero if $p_2$, $p_1$, $p_0$, $q_0$, $q_1$ and $q_2$ lie on a straight line.

When weak filter is selected, a decision (dEp1) regarding whether to filter p1 is determined by testing "if ($d_p$<(($\beta$+($\beta$>>1))>>3))". If the condition is true, dEp1 is set to 1. Also a decision (dEq1) regarding whether to filter p1 is determined by testing "if ($d_q$<(($\beta$+($\beta$>>1))>>3))". If the condition is true, dEq1 is set to 1. Furthermore, $\Delta$ is calculated, where $\Delta$=(9*($q_0$−$p_0$)−3*($q_1$−$p_1$)+8)>>4. If abs($\Delta$)<$t_c$*10, then $\Delta$=Clip3(−$t_c$, $t_c$, $\Delta$), $p_0'$=Clip1$_Y$($p_0$+$\Delta$), and $q_0'$=Clip1$_Y$($q_0$+$\Delta$), where Clip1$_Y$(x) clips the x value between the maximum and minimum luminance values. When dEp1 is set to 1, $\Delta p$=Clip3(−($t_c$>>1), $t_c$>>1, ((($p_2$+$p_0$+1)>>1)+$\Delta$)>>1) and $p_1'$=Clip1$_Y$($p_1$+$\Delta p$). When dEq1 is set to 1, $\Delta q$=Clip3(−($t_c$>>1), $t_c$>>1, ((($q_2$+$q_0$+1)>>1)−$q_1$+$\Delta$)>>1) and $q_1'$=Clip1$_Y$($q_1$+$\Delta q$). If $p_2$, $p_1$, $p_0$, $q_0$, $q_1$, and $q_2$ lie on the same line, as shown in FIG. 11, then $\Delta$, $\Delta p$ and $\Delta q$ will be zero. The example shown above illustrates derivation of boundary strength, filter on/off decision, strong/weak filter decision based on four lines across a boundary between two 8×8 blocks. The present invention may also be applied to other block sizes by dividing the boundary into sub-boundaries and derives the boundary strength, filter on/off decision, strong/weak filter decision based on pixels with respect to individual sub-boundaries.

For chroma filtering, the boundary strength (BS) is used to determine whether the deblocking filtering should be applied. If BS>1, then $\Delta$=Clip3(−$t_c$, $t_c$, (((($q_0$−$p_0$)<<2)+$p_1$−$q_1$+4)>>3)), $p_0'$=Clip1$_C$($p_0$+$\Delta$) and $q_0'$=Clip1$_C$($q_0$+4), where Clip1$_C$(x) clips the x value between the maximum and minimum chroma values.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of deblocking reconstructed video in a video coding system, the method comprising:
   receiving reconstructed pixel data, wherein the reconstructed pixel data is configured into LCUs (largest coding units) and each LCU is divided into blocks;
   identifying a first horizontal edge group comprising one or more horizontal block edges between two LCUs from horizontal block edges of the blocks in the LCUs;
   identifying a second horizontal edge group comprising remaining horizontal block edges not included in the first edge group from horizontal block edges of the blocks in the LCUs;
   applying first vertical filtering to the reconstructed pixel data corresponding to one or more first horizontal lines above a first horizontal block edge in the first horizontal edge group; and
   applying second vertical filtering to the reconstructed pixel data corresponding to one or more second horizontal lines above a second horizontal block edge in the second horizontal edge group, wherein a first number of said one or more first horizontal lines is smaller than a second number of said one or more second horizontal lines.

2. The method of claim 1, wherein the first number is one.

3. The method of claim 2, wherein said one or more first horizontal lines are stored in one line buffer, and wherein said one line buffer is shared with intra prediction process used in the video coding system.

4. The method of claim 1, wherein additional pixel data corresponding to one or more third horizontal lines above the first horizontal block edge are used to determine filter decision and/or filter operation for the first vertical filtering, and wherein the additional pixel data is stored in a sub-sampled pattern.

5. The method of claim 4, wherein the additional pixel data corresponds to the reconstructed pixel data or intermediate pixel data.

6. An apparatus of deblocking reconstructed video in a video coding system, the apparatus comprising:
   circuitry configured to receive reconstructed pixel data, wherein the reconstructed pixel data is configured into LCUs (largest coding units) and each LCU is divided into blocks;
   circuitry configured to identify a first horizontal edge group comprising one or more horizontal block edges between two LCUs from horizontal block edges of the blocks in the LCUs;
   circuitry configured to identify a second horizontal edge group comprising remaining horizontal block edges not included in the first edge group from horizontal block edges of the blocks in the LCUs;
   circuitry configured to apply first vertical filtering to the reconstructed pixel data corresponding to one or more first horizontal lines above a first horizontal block edge in the first horizontal edge group; and
   circuitry configured to apply second vertical filtering to the reconstructed pixel data corresponding to one or more second horizontal lines above a second horizontal block edge in the second horizontal edge group, wherein a first number of said one or more first horizontal lines is smaller than a second number of said one or more second horizontal lines.

7. The apparatus of claim 6, wherein the first number is one.

8. The apparatus of claim 7, wherein said one or more first horizontal lines are stored in one line buffer, and wherein said one line buffer is shared with intra prediction process used in the video coding apparatus.

9. The apparatus of claim 6, wherein additional pixel data corresponding to one or more third horizontal lines above the first horizontal block edge are used to determine filter decision and/or filter operation for the first vertical filtering, and wherein the additional pixel data is stored in a sub-sampled pattern.

10. The apparatus of claim 9, wherein the additional pixel data corresponds to the reconstructed pixel data or intermediate pixel data.

* * * * *